United States Patent [19]

Wallace et al.

[11] 4,137,667
[45] Feb. 6, 1979

[54] THERMAL PROTECTIVE COVERINGS

[76] Inventors: Volney Wallace, Terra, Box 1 West; Carlos F. A. Pinkham, Terra, Box 4 East, both of Dugway, Utah 84022

[21] Appl. No.: 863,801
[22] Filed: Dec. 23, 1977
[51] Int. Cl.² ............................................. A01G 13/00
[52] U.S. Cl. ......................................... 47/26; 47/29; 47/2
[58] Field of Search .................... 47/2, 28, 29, 32, 17, 47/26

[56] References Cited

U.S. PATENT DOCUMENTS

| 3,206,892 | 9/1965 | Telkes et al. | 47/29 |
| 3,270,461 | 9/1966 | Fowler | 47/2 |
| 3,727,345 | 4/1973 | Smith | 47/2 |
| 4,071,974 | 2/1978 | Tripp | 47/2 |

FOREIGN PATENT DOCUMENTS

| 68643 | 10/1892 | Fed. Rep. of Germany | 47/28.1 |
| 1508260 | 11/1967 | France | 47/29 |
| 2304277 | 10/1976 | France | 47/29 |
| 1144366 | 3/1969 | United Kingdom | 47/2 |

Primary Examiner—Robert E. Bagwill
Attorney, Agent, or Firm—Criddle, Thorpe & Western

[57] ABSTRACT

Protective coverings for growing plants, food storage shelters, greenhouses and other structures provided by creating a relatively dead air space around the protected object with a device for deploying a canopy of water over and around said object.

10 Claims, 8 Drawing Figures

THERMAL PROTECTIVE COVERINGS

BACKGROUND OF THE INVENTION

This invention relates to a method and means for thermally protecting objects from cold temperatures. This invention particularly relates to a method of protecting objects from cold temperatures by utilizing an aqueous cover around said objects.

British Pat. No. 1,144,366 teaches a method for the protective covering of plants by interposing an aqueous layer between the area to be protected and the sky.

While the concept taught in the British Patent sets forth many advantages of utilizing water or water mixtures as thermal protective coverings, there are certain novel improvements which are the subject matter of the present invention.

When water is deployed as a relatively air tight covering over a space to be protected, cold weather cannot freeze anything in that space until it first freezes the protective cover of water. The freezing of this water is slow because water liberates heat on freezing, about 80 calories of heat per gram of ice formed. This release of heat is comparable to the release of an equal weight of rock cooling from about 500° Farenheit down to about 32° Farenheit. In contrast to the hot rock, water releases its heat at 32° Farenheit as if it were a water burning furnace thermostated at 32°. Since heat loss from the system is proportional to the difference between the inside and outside temperature this low temperature release of heat is far more effective than would be a hot rock under a hot cap.

The above-mentioned British Patent is limited to the protection of plants by interposing between the plant and the sky a layer of water in translucent containers. In all cases a multiplicity of containers are used. The primary application of the British Patent is the covering of plants growing in a depression for an extended period of time. The patent purportedly proposes to cover single plants by utilizing a light admitting cover over a plant with water bags leaning on the cover thus covering the plant. The bags of water, if they are pliable enough to come together and seal out cold air, flow downhill and form a series of contained puddles alongside the light admitting the protective cover.

There is much need for protection of seedlings and young plants against late frosts in the Spring to enable an early start of vegetables and other seedlings. A plant which has a month's head start has an additional month at the end of the season when full development of the plant results in a maximal rate of food production. Buildings such as greenhouses, storage sheds, pits and similar structures wherein perishable material is stored or grown are susceptible to cold. Items contained in such storage structures often require elaborate heating and ventilation systems.

BRIEF DESCRIPTION OF THE INVENTION

It has been discovered that certain structural means for deploying water in a flexible bag which is invaginated or has a core around a structure surrounding the plant is far superior to laying bags of water against a structural device. A second method for covering plants utilizes a self-supporting container being so formed as to contain an upwardly extending dome or indentation in the center thereof or running longitudinally down the center of the frame.

A third structural feature of the present invention may be utilized for plants, buildings and other structural devices. The structure consists of a pan-shaped open work support utilized to support a plastic sheet. The plastic sheet is filled with water and contains spaced-apart, upwardly-projecting support means which are preferrably shaped so that the perimeter at the top is smaller than the perimeter at the bottom. Said upwardly extending supports are about equal to the depth of the pan. The pan-shaped device is filled with water which freezes to form a top protective layer. A portion of the water is then drained from the pan forming a surface wherein the second protective layer of ice may be formed having an essentially dead air space between the first and second layers of ice. The process can be repeated to create multiple dead air spaces over the protective water layer.

Another embodiment of the invention involves a pan-shaped work support made water-tight by the use of a plastic liner or sheath. It is desirable that it be so made that the plastic sheath covering the pan-shaped support work be constructed in such a way that it can be pulled back for partial or complete uncovering of the protected space below. This provides a simple easy procedure for uncovering a greenhouse to prevent build-up of excessive heat during warmer weather without the necessity of a major investment in air conditioning equipment.

A still different feature of the invention involves a flowing film of water down either the inside or outside walls of a protective cover which, when cooled, releases heat to the object being protected inside the cover.

Aqueous solutions or plain pure water can provide protection against the cold by the heat released on freezing. It is not the intent of this invention to be limited to any particular aqueous solution. For example, certain specific aqueous solutions maintain certain advantages. A viscous water solution or a gelatinous water solution will function quite well as a freezable barrier for protecting plants and other goods and have the specific advantage that there is little or no convective currents in the water to hasten heat transfer with a cold environment. Additives to water that improve its absorption of near infrared radiation, green light and/or ultraviolet light will lessen the excursion of temperature under the water barrier by day without interfering with photosynthesis and will hasten solar melting of any ice formed. Additives that absorb ultraviolet light can prolong the life of a plastic container. If desired, the water can also be shaded, or if it is not to be used over growing plants for extended periods of time, it can even be opaque. The water container can be similarly clear or absorbent.

When utilizing any form of this invention, an essentially air tight space will be formed about the structure or plant being protected. As regards plants, the air tight space created around the plant does not interfere with photosynthesis. While an air tight cover over the plants may exclude atmospheric $CO_2$, the atmosphere surrounding the plants contain $CO_2$, there being sufficient $CO_2$ gas diffusing from the soil to support good growth of seedlings under an air tight cover. Even if there were to be circumstances wherein the $CO_2$ supply was seriously limited under such coverage the grower could improve the supply of $CO_2$ by adding fermentable matter to the soil or setting up a fermentation vessel within the protected space. Also ventilation can be provided to

DRAWINGS

DETAILED DESCRIPTION OF THE INVENTION

Figure 1:
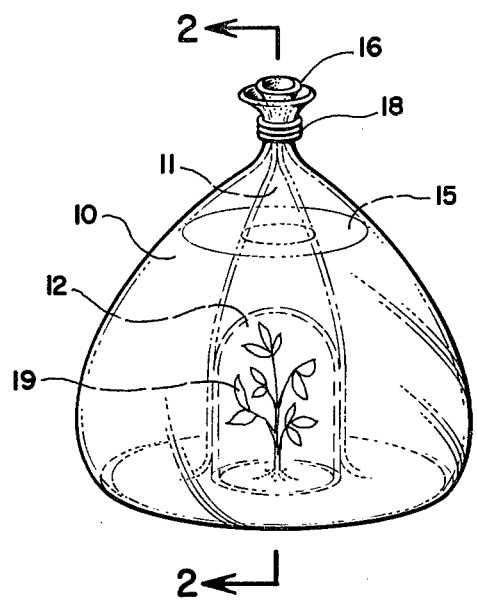
FIG. 1 is a perspective view of an invaginated water bag completely encompassing a rigid structure which surrounds a plant thereby forming a dead air space around the plant substantially enclosed by water.
Figure 2:
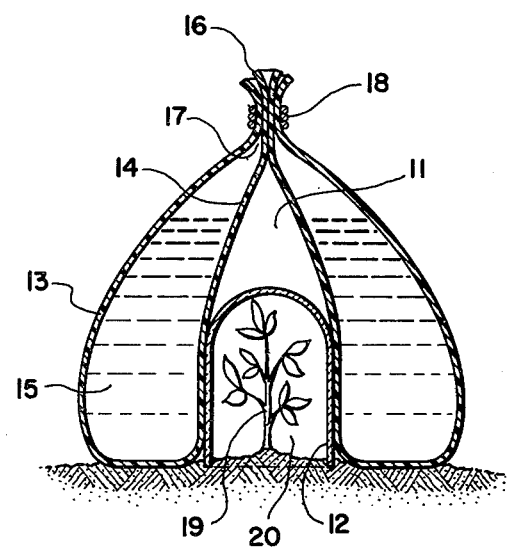
FIG. 2 is a cross section of FIG. 1 taken along lines 2—2.

One embodiment of the invention for protecting plants comprising a bag having an invaginated opening formed by fitting the bag over a protective cover. A plastic bag containing an aqueous solution and which is capable of becoming invaginated when placed over a protective cover may be used. However, this bag, unless secured at the top may have a tendency to lean. An alternative embodiment as more clearly shown in FIGS. 1 and 2 comprises a flexible tube 10 which is more than twice as long as the protective cover 12 is high and is somewhat larger in diameter than the protective cover. The tube is turned halfway inside out to form a structure having a hollow core 11. The outer walls 12 turned under inner walls 14 define an annular space 15 which is filled with water. The ends 16 and 17 are then securely tied together by a tie 18. The tying of the inner and outer parts together prevents the unwanted leaning of the water-filled tube when placed over a protective cover 12. A plant 19 thus has a dead air space 20 defined by protective cover 12 and is completely covered by a canopy of water. If desired, tie 18 may be loosely tied allowing a small opening into the hollow core 11 for watering the plant contained therein.

Figure 3:
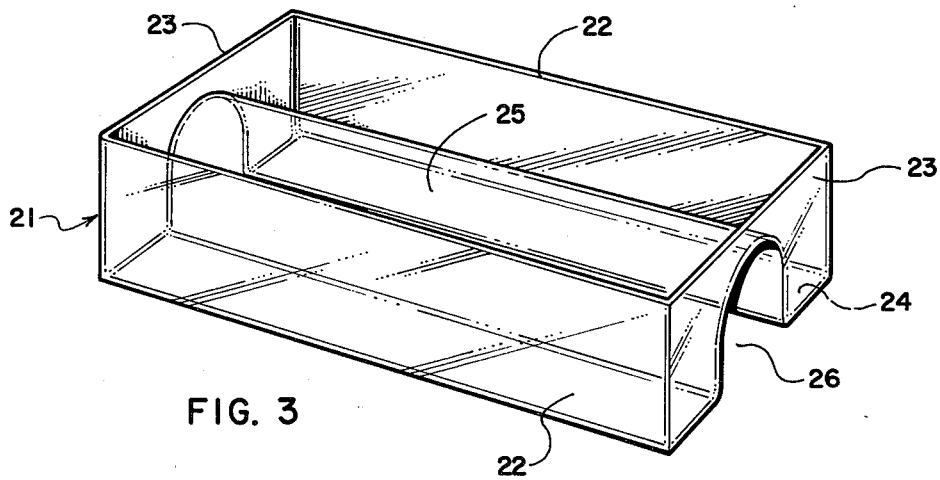
FIG. 3 shows a different embodiment of the invention showing a trough shaped structure having an upwardly extending indentation running longitudinaly through the center of the structure.
Figure 4:
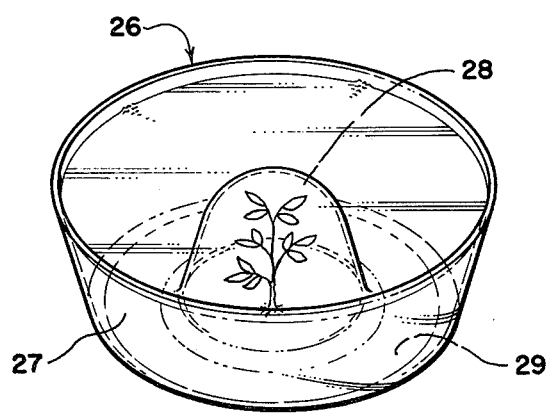
FIG. 4 illustrates an embodiment similar to that shown in FIG. 3 containing a dome-shaped structure.

A second method and one most easily employed is shown by FIGS. 3 and 4. FIG. 3 shows a self-supporting elongated trough 21 that is designed to form a protective dome of water over the plant to be protected. Trough 21 can be placed end to end to protect an entire row of crops. Trough 21 consists of a container-like structure having sidewalls 22 and endwalls 23. The bottom 24 contains a convex dome-shaped indentation 25 extending longitudinally from one end of trough 21 to the other. Indentation 25 is lower than the top of sidewalls 22 and endwalls 23 so that when trough 21 is filled with water, indentation 25 will be completely covered. Thus a dead air space 26, for plants adapted to be protectively covered by water, is created.

FIG. 4 is similar to FIG. 3 and is designed to cover a single plant or a small cluster of plants. A circular trough 26 having an outer wall 27 and an inner dome 28 separated by a floor 29 provides a protective cover. Dome 28, similar to indentation 27 of FIG. 3, extends upwardly from the floor 29 thereby creating a dead air space inside the dome adapted to fit over a plant. The dome 28 does not extend upwardly as far as wall 27 so that the dome is completely covered with water when trough 26 is filled.

Obviously FIGS. 3 and 4 could be altered to provide other shapes and configurations for self-supporting water containers all having an underside indentation which will be covered by water when the container is filled.

Figure 5:
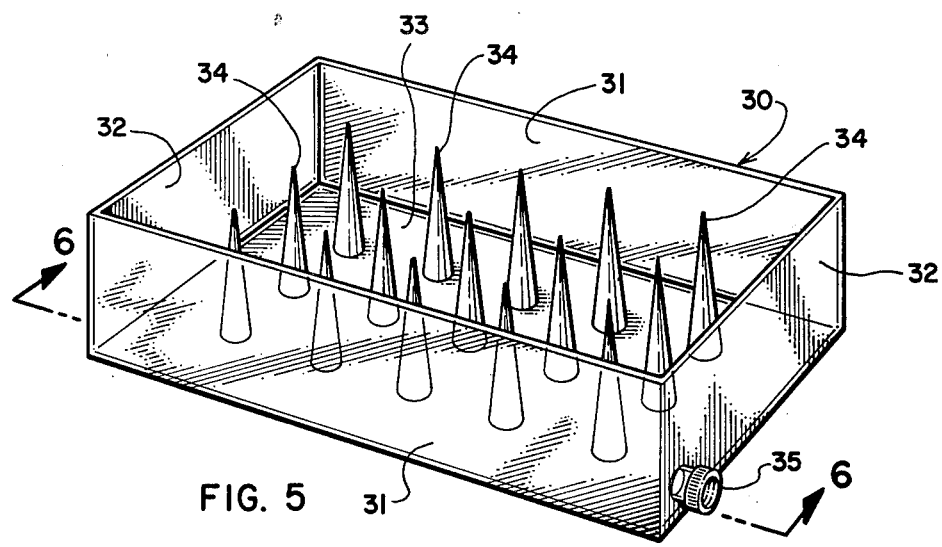
FIG. 5 shows a still different embodiment of the invention consisting of a pan-shaped structure having supporting risers contained therein.
Figure 6:
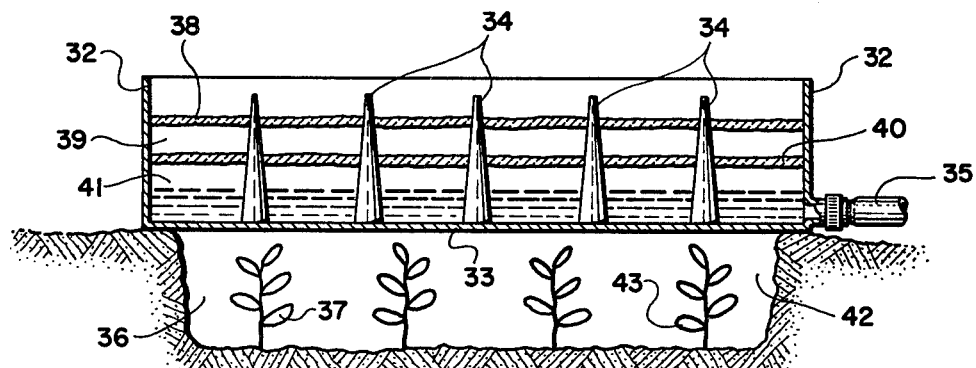
FIG. 6 is a cross-sectional view of FIG. 5 taken along lines 6—6 illustrating the creation of dead air spaces made from ice.

FIGS. 5 and 6 illustrate a still different embodiment designed to create one or more layers of dead air space between a plant or structure and the outside atmosphere. The protective structure consists of a pan 30 having sidewalls 31, endwalls 32 and a floor 33. Pan 30 may be an open structure which may be lined with a plastic lining to hold an aqueous solution. Extending from the floor 33 of pan 30 are vertical supports 34 which may be in the shape of an inverted cone having a larger diameter at the base than at the top. A spout, valve or other means 35 located on endwall 32 or sidewall 31 just above floor 33 or in the floor serves as a means for drawing water from pan 30 until a desired level is reached.

When used as a protective cover pan 30 will be placed over an indentation containing growing plants or other objects to be protected. When the outside temperature drops below the freezing point of water in pan 30, a layer of ice 38 is formed. The withdrawal of unfrozen water through spout 35 causes the water level to drop thereby creating a dead air space 39 between ice layer 38 and the water level. Upon additional freezing a second layer of ice 40 is formed. Again water may be withdrawn through spout 35 creating a second dead air space 41 between the second layer of ice and the water level. Other insulating layers of ice can also be created in the same manner. The dead air space 42 surrounding plants 43 is thus protected by several insulating layers of ice and water containing air spaces in between. Instead of using vertical supports 34, stones, bricks and the like may be used for supports as long as the ice layer will cling to the surface of the materials being used.

Figure 7:
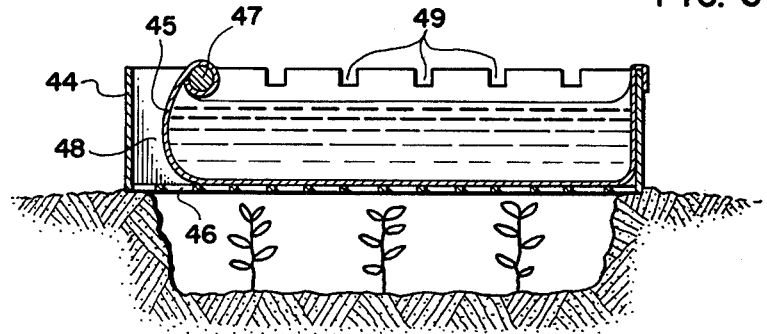
FIG. 7 shows yet another embodiment of the invention showing a flat pan having a plastic liner which is movable thereby opening the area under the structure to the outside atmosphere.
Figure 8:
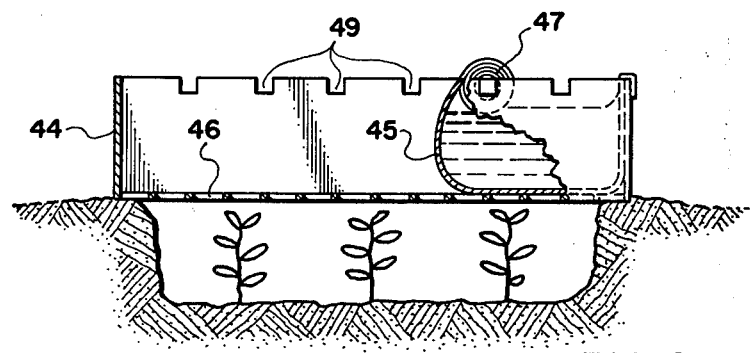
FIG. 8 is similar to FIG. 7 showing the plastic lining further removed thereby creating more exposure to the open atmosphere.

Another modification is illustrated in FIGS. 7 and 8. The only difference being in the positioning of the liner and the supports. Pan 44 consists of a walled-in structure similar to that shown in FIGS. 5 and 6 and contains a moveable liner 45 which may completely cover an open network floor 46 or be rolled back to expose the floor and the space beneath to the outside atmosphere. The liner 45 may be rolled about a roller 47 extending such as to overlap sidewalls 48 of the pan 44 and be held in slots 49. Thus partial or complete uncovering of a space below pan 44 is obtained. This provides a much needed simple procedure for uncovering structures such as greenhouses thereby preventing the buildup of excessive heat on warm or hot days without having to make a major investment in air conditioning equipment.

When used as a protective cover for a building such as a greenhouse, a horizontal water layer roof may not admit as much light as wanted. In this event an exterior reflector may be installed to increase the input of light through the water barrier. Reflective interior walls may also be used to ensure that the light that does enter gets down to the plant growing level. Another alternative would be to use a terraced water cover with either transparent or reflective risers between terraces to admit or reflect more light into the space below the cover.

The basic effect of the water barrier in protecting a space enclosed by the barrier is delay in temperature drop. In cool weather such as encountered in spring and fall, the delay is sufficient and the cold periods short enough that freezing inside the barrier is prevented. If severe cold conditions render the water barrier insufficient, several options are available to extend the protection. The multilayered device shown in FIGS. 5 and 6 is one. Another means of extending protection would be to replace the ice formed with unfrozen water or by covering the protector with additional insulation such as a plastic tent cover or by floating foamed pieces of a plastic such as polyurethane or polystyrene on the water.

Trees and other irregular shaped objects can be protected with an enveloping cover of water by placing a cover over them and causing a flow of a film of water down either side of the cover. This protects the object against cold by chilling the falling film of water. The object can also be protected against severe cold by ice formation over the cover with the release of the heat of fusion.

While the invention has been described in the best mode known, the invention is not to be limited to those embodiments shown but is to be governed by the scope of the appended claims and equivalents thereof.

We claim:

1. A self-supporting thermal protective cover for materials perishable by cold temperatures comprising a pan-shaped structure having outer walls, a floor and an upwardly extending indentation in said floor, said indentation being lower than the walls of the pan-shaped structure said pan being filled with a freezable liquid completely covering the indentation, said indentation enclosing the perishable material.

2. A thermal protective cover according to claim 1 wherein the pan-shaped structure is rectangular in shape and the indentation extends longitudinally along the floor.

3. A thermal protective cover according to claim 1 wherein the pan-shaped structure is circular in shape and the indentation extends as a dome from the floor.

4. A thermal protective cover for materials perishable by cold temperatures comprising a pan-shaped structure containing walls and a floor having vertical supports on the floor and containing means in the lower portion of the walls to drain a freezable liquid and at least one layer of frozen liquid suspended on said vertical supports in such a manner as to create a dead air space between the frozen liquid layer and the freezable liquid said pan-shaped structure being suspended over the material to be protected.

5. A thermal protective cover for materials perishable by cold temperatures comprising a pan-shaped structure containing walls and a floor and having a lining containing a freezable liquid wherein said lining is capable of being moved exposing portions of the floor and space thereunder, containing the perishable material, to the outside atmosphere.

6. A method of protecting perishable materials from cold temperatures which comprises covering said materials to be protected with a self-supporting pan-shaped structure having outer walls, floor and an upwardly extending indentation covering the materials to be protected, said indentation being lower than the outer walls of the structure, said structure being filled with a freezable liquid completely covering the indentation.

7. A method of protecting perishable materials from cold temperatures according to claim 6 wherein the self-supporting structure is rectangular in shape and the indentation covering the perishable materials extends longitudinally along the floor.

8. A method of protecting perishable materials from cold temperatures according to claim 6 wherein the self-supporting structure is circular in shape and the indentation covering the perishable materials extends as a dome from the floor.

9. A method of protecting perishable materials from cold temperatures which comprises covering said materials with a pan-shaped structure containing walls and a floor having vertical supports on the floor and containing means in the lower portion of the walls to drain a freezable liquid from the pans, said pan containing a freezable liquid and at least one layer of frozen liquid suspended on said vertical supports in such a manner as to create a dead air space beneath the frozen liquid.

10. A method of protecting perishable materials from cold temperatures which comprises covering said materials with a pan-shaped structure containing walls and a floor and having a moveable lining containing a freezable liquid wherein said lining is capable of being moved exposing portions of the floor and the space thereunder containing the perishable materials to the outside atmosphere.

* * * * *